June 29, 1937.   J. F. BELLINGER   2,085,069
STILL FOR RENOVATION OF USED OILS
Filed Aug. 28, 1935   2 Sheets-Sheet 1

Inventor,
James F. Bellinger,
By
Minturn & Minturn
Attorneys.

June 29, 1937. J. F. BELLINGER 2,085,069
STILL FOR RENOVATION OF USED OILS
Filed Aug. 28, 1935   2 Sheets-Sheet 2

Inventor,
James F. Bellinger.
By
Minturn & Minturn
Attorneys.

Patented June 29, 1937

2,085,069

UNITED STATES PATENT OFFICE 2,085,069

STILL FOR RENOVATION OF USED OILS

James F. Bellinger, La Fayette, Ind., assignor to Scientific Oil Corporation, Indianapolis, Ind.

Application August 28, 1935, Serial No. 38,260

9 Claims. (Cl. 196—104)

This invention relates to means for renovating or recovering lubricating oil from drainings of the type taken from engine crank cases such as is taken from automobiles and the like. It is a primary object of my invention to remove the foreign matter such as carbon, metals, dust, water, and diluting substances such as gasoline from the oil to obtain a good colored oil of excellent lubricating properties equally as good as the original oil before being contaminated through use.

It is a primary object of my invention to provide a unique type of still which will take care of foaming of heated oil due to water content and which will be extremely efficient in fuel use. It is a further object of my invention to provide means for utilizing the more volatile oils driven off in the still as a means for heating the still so as to utilize such volatile material without loss.

It is a still further important object of my invention to provide means for condensing the vapors of the still without having to employ special cooling means other than the atmosphere or steam employed in the process.

Figure 1:
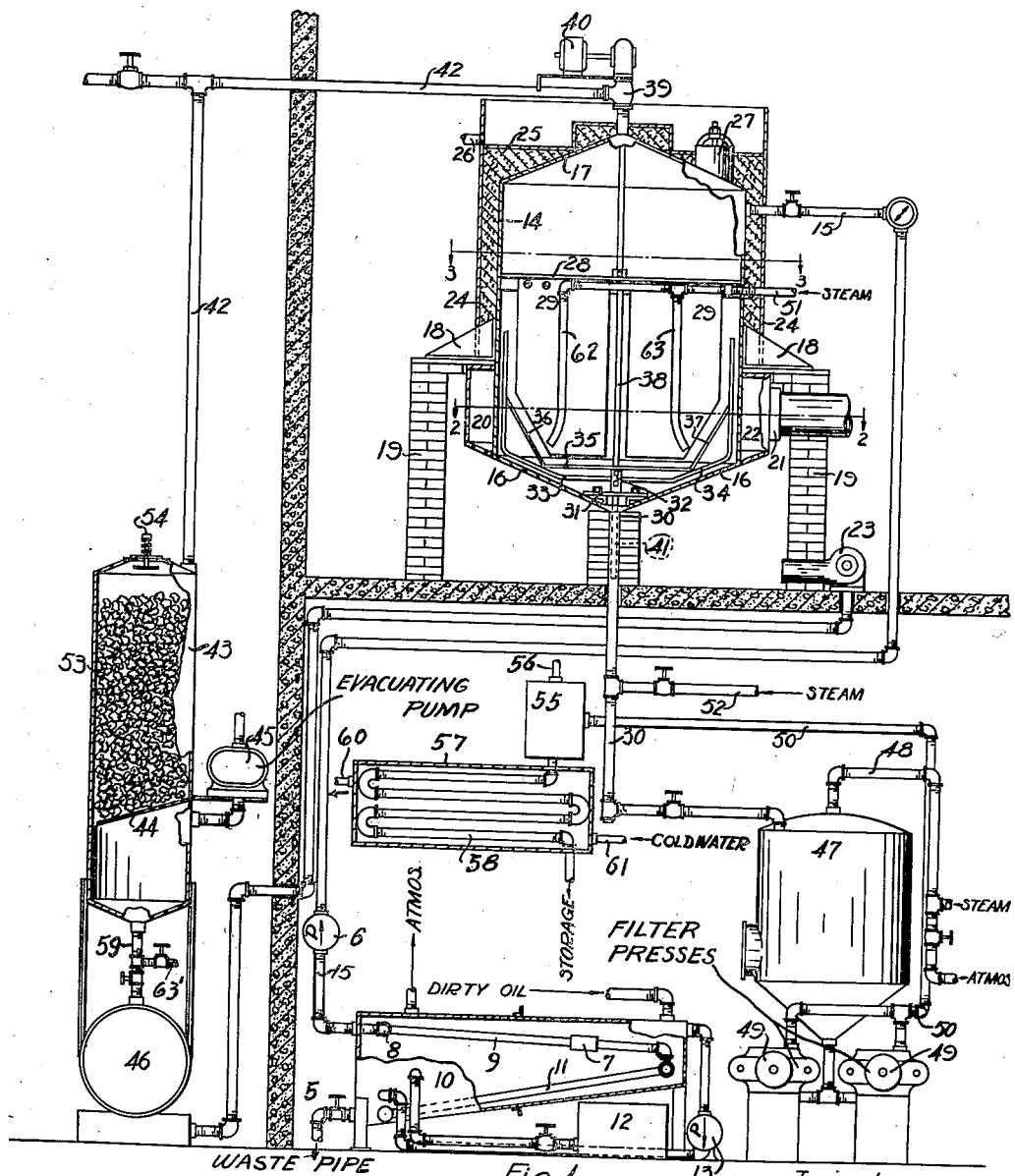
Figure 2:
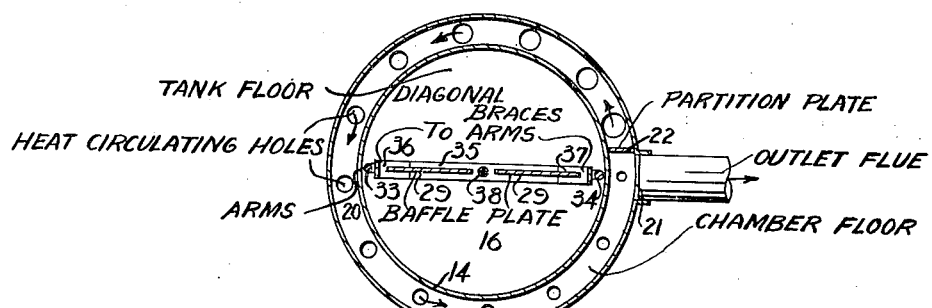
Figure 3:
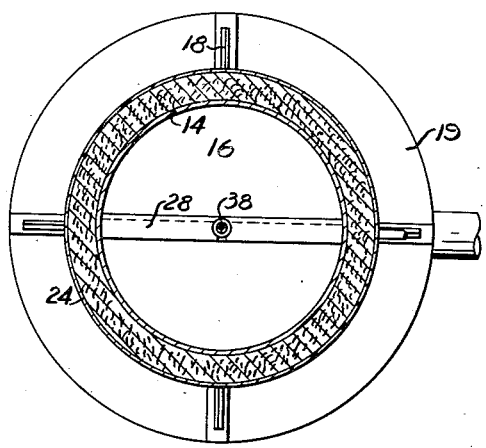

These and other objects and advantages of the invention will become apparent to those versed in the art in the following description wherein one particular form of apparatus adapted to carry out my invention is illustrated in the accompanying drawings, in which Fig. 1 is an elevation in more or less diagrammatic representation of an installation embodying my invention;

Fig. 2, a transverse horizontal section through the still on the line 2—2 in Fig. 1;

Fig. 3, a similar section through the still on the line 3—3 in Fig. 1, and

Figure 4:
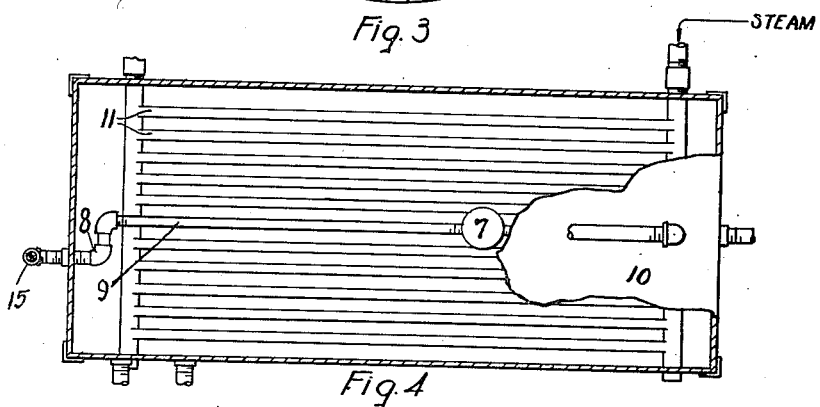

Fig. 4, a top plan view of an oil preliminary treating tank.

Like characters of reference indicate like parts throughout the drawings.

The dirty oil to be reclaimed is brought into a central plant and held in storage until a sufficient amount has accumulated to give an economical run of the apparatus. The dirty oil is first conducted into a treating tank 10 which is rectangular in shape and comparatively shallow and further formed to have a sloping floor, sloping from one end down toward the other. The tank is covered over across the top and some form of heating means is provided, here shown as a plurality of steam pipes 11 spaced immediately above the floor of the tank. By reason of the sloped floor of the tank, the tank may be readily drained of collecting sediment, from the lower end.

From a suitable tank 12 in which is mixed the desired treating agent, is conducted the treating agent to the treating tank 10. After the proper quantity has been introduced into the tank 10, the mixture of this agent and the oil is circulated through the tank by pumping in at the bottom and withdrawing from the top through the pump 13.

The particular chemical or chemicals employed are immaterial to the present invention, it only being essential that the chemicals are of that nature which will induce coagulation and precipitation of the foreign solids in the oil, the prior art teaching various types of chemicals for this purpose.

After the oil in the tank 10 has been suitably mixed and heated, the mixture is allowed to stand for approximately eight hours for the foreign matter to settle. Then through pipe 9 which acts as a skimmer the desirable oil is drawn off by pump 6 and is carried to the still 14 or to storage. The pipe 9 swings vertically about a joint 8 and has a float 7. Sediment and waste is drawn from the tank through pipe 5. This still 14 is essentially a cylindrical tank having a conical floor 16 and a conical top 17. The tank is suspended by brackets 18 to have its lower end surrounded in spaced relation by a suitable wall 19 such as brick to form a combustion chamber therearound and thereunder.

An annular chamber 20 is formed around the lower part of the still 14 to extend upwardly from its lower end along its side a short distance within the chamber formed by the wall 19. The under side of this chamber 20 has a floor which is a continuation of the floor 16 of the still. In this floor of the chamber 20, I space circumferentially therearound a plurality of holes increasing in size from immediately below a flue outlet 21 therearound to a partition plate 22 which is spaced adjacent the outlet 21. A burner 23 of some type, preferably of an oil burner type, so as to utilize distillates obtained from the still, sets up combustion within the chamber defined by the wall 19 in the under side of the still 14, and the products of that combustion can escape only upwardly along the under side of the still and out through the holes in the bottom of the chamber 20 and thence out through the flue outlet 21. It is thus to be noted that heat is applied to the still principally on the under side and around a very small portion of the vertical wall. It is furthermore to be noted that by reason of the annular chamber 20, the heat is applied very efficiently to the still.

The upper portion of the still 14 which extends above the wall 19, that is the major portion of the still, is enclosed within a jacket 24 spaced from the still to have the space therebetween packed with some suitable insulating material such as mineral wool. The jacket 24 extends above the still 14 and has an upper floor 25 preferably made of metal extending across the upper side of the still but spaced below the top of the jacket so as to provide an overflow chamber which may be drained by the pipe 26. A manhole 27 extends upwardly through the floor 25 and is provided with a cover which is held in sealed position during the major operation of the still.

Within the still 14 and near the upper end of the cylindrical wall thereof, I fix diametrically thereacross an angle iron 28 from which hangs a baffle plate 29. The plate 29 is in reality in two sections spaced apart from the vertical axial line of the still and each of the sections terminates a slight distance from the outer wall of the still and has its outer lower corner cut away to permit the lower edge of each section to be positioned well down within the conical base of the still. The base of the still is provided with a drain pipe 30 at its apex. A bearing plate 31 is fixed within the base well toward its apex and immediately above the inner end of the pipe 30 to support thereon an agitating member which will now be described. A body 32 rests by its lower end on the top side of the plate 31 and has fixed thereto a pair of arms 33 and 34 which extend initially horizontally in diametrical relation from near the lower end of the body 32 outwardly toward the floor of the still and thence upwardly therealong in parallel relation and finally vertically upwardly in spaced relation from the cylindrical wall of the still to terminate near, but somewhat below, the angle iron 28. A brace is provided consisting of a plate 35 which is secured to the top side of the body 32 to extend laterally in each direction therefrom across to the upturned arms 33 and 34 respectively where the ends of the plate are secured thereto. From each end of the plate 35 a diagonal brace 36 and 37 respectively extends upwardly to be secured by its upper end to the upright portions of the arms 33 and 34 as indicated in Fig. 1. The outer lower corners of the two sections of the baffle plate 29 are cut away to provide clearance for these braces. A tube 38 is fixed axially in the body 32 and extends upwardly through the horizontal leg of the angle 28 for a bearing and thence continues upwardly out through a pipe in the apex of the top of the still, through an L fitting 39, through a packing gland to be connected with a motor 40 which serves to revolve the tube 38.

A flat bar 41 is fixed in the lower end of the body 32 to extend downwardly through the plate 31 and well down within the pipe 30 to serve as an agitator to prevent clogging of the pipe when the still is drained. From the L 39, a pipe 42 is carried around and down into a condenser of separator 43. This condenser consists essentially of a cylindrical steel tank having a floor 44 fixed therein toward the bottom but spaced at a distance thereabove and sloping to one side. The upper portion of the condenser is filled with some material such as coarse coke to rest on the floor 44. This floor 44 is united with the inner side of the wall of the condenser around at least the upper half of its circumference, the lower end of the floor being cut back to leave an opening between it and the wall of the condenser to permit fluids condensing and falling to the floor to drain downwardly and discharge through that opening.

An evacuating pump 45 has its intake connected to the condenser at a position immediately under the floor 44 and at its higher end. A drain is provided from near the lower end of the condenser into a receiving tank 46, from which the distillate received therein may be conducted to the burner 23.

The pipe 30 is carried down to a pressure tank 47. From any suitable source steam is conducted through a line 48 into the top of the tank 47 so that when the pipe line 30 is cut off, the contents of the tank 47 may be forced out therefrom under pressure. The discharge of the tank 47 is here shown as from the conical bottom into one or more filter presses 49, from which presses a discharge pipe 50 leads to a steam separator and heat exchanger comprising a tank 55 with a top vent 56 for the escape of watery vapors and a discharge through pipe 58 to storage. The pipe 58 is in a coil located in tank 57 surrounded by cold water flowing in through pipe 61 and out through 60. The pipe 58 discharges to any suitable storage (not shown). Since the presses 49 may be of any suitable type commercially obtainable, the details thereof are not herein shown nor described, such details not entering into my invention as such. A pipe 51 also conducting steam is provided to enter the still 14 where it has branches 62 and 63 that discharge therein at a position herein shown as against the conical floor 16 of tank 14 through appropriately bent ends of the pipes. Steam may also be introduced into the still 14 through the pipe 52 which connects with the pipe 30 so as to bring the steam up through the bottom of the still to effect agitation.

In operating the assembly above described, the oil from the tank 10 is slowly conducted into the still 14 with the cover of the manhole 27 left off. The still is heated from its under side as above indicated by the burner 23 and the inflow of the treated oil is so regulated that the oil will not foam out from the top of the still. The oil being treated usually has quite a little moisture in it, generally in the form of an emulsion and when first heated has a tendency to foam considerably. However this condition is counteracted in the still by setting the motor 40 in operation to revolve the agitating means comprising the arms 33 and 34. These arms are preferably cylindrical and as they revolve in close proximity to the wall of the still, they pass through the heated oil and by reason of the eddy currents set up as the oil flows in behind these moving members, the bubbles of steam coming from the water in the oil are quickly and readily separated from the oil films and allowed to collect and escape upwardly, particularly along the arms. This action is further accentuated by reason of the presence of the baffle 29, some of the oil being caused to flow across and in through the central opening to effect further agitation not of a violent nature but gently releasing the water vapor without the tendency to foam. After the oil introduced into the still 14 has been sufficiently heated and the moisture eliminated as just described, then a suitable filtering clay is manually introduced into the oil through the manhole 27, after which the cover is placed on the manhole 27 and steam is allowed to flow into the still to cause further agitation and also to give a steam atmosphere above the oil. A temperature is allowed to rise to the neighborhood of around 500° to 600° F. which will cause the lighter products in the oil to vaporize. The steam entering the still is allowed to escape out through the pipe 42 and down through the condenser and out through the pump 45. Any water condensing is caught in the bottom of the condenser 43 and withdrawn there. In fact most of the vapors drawn off from the oil in the still will be condensed in the pipe line 42 by reason of the presence of the steam, the temperature of which is but little above 230° F. or much below the vaporization point of the hydrocarbons driven off. In other words the flow of steam carrying the vapors aids considerably in condensing the distillate. The condensation is further hastened by the presence of a mass of coke 53 in the condenser resting on the floor 44. The rough coke surfaces afford effective condensation points cooled by the steam. The condenser 43 has a suction valve 54 set to open at a predetermined suction which admits atmospheric air to maintain a constant pressure on the still 14. This air further assists in condensing the vapors entering the condenser 43 through pipe 42. At the bottom of tank 43 is a clean-out pipe 59—63' controlled by suitable valves.

Following this step of removing the lighter ends, the still is drained through the pipe 30 into the pressure tank 47, the tank 47 being of sufficient capacity to receive the quantity of oil from the still 14. The pipe 30 is then closed off and steam pressure applied to the tank 47 to force the oil into the filters 49 where the matter which has been collected by the filtering clay is filtered out and left behind as the clear oil leaves the filters and goes to the heat exchanger and then to the storage tank.

While I have herein shown and described my invention in the best form as now known to me, it is obvious that various changes may be made without departing from the spirit of the invention and I, therefore, do not desire to be limited to that precise form beyond the limitations which may be imposed by the following claims.

I claim:

1. A still for renovating used oil comprising a tank, a flue chamber encircling the lower outer side of the tank and having an outlet on one side, a baffle across the chamber adjacent the flue outlet, the floor of said chamber having a series of holes therethrough increasing in size from immediately below the flue outlet therearound to the baffle, and a combustion chamber under the tank in communication with said flue chamber through said holes.

2. A still for renovating used oil comprising a tank, a flue chamber encircling the lower outer side of the tank and having an outlet on one side, a baffle across the chamber adjacent the flue outlet, the floor of said chamber having a series of holes therethrough, a combustion chamber under the tank in communication with said flue chamber through said holes, arms revolubly mounted within the tank extending upwardly in close proximity to the side wall of the tank, a central baffle in the tank terminating by its vertical edges to permit said arms to pass between those edges and said tank wall, and means for revolving said arms.

3. A still for renovating used oil comprising a tank, a flue chamber encircling the lower outer side of the tank and having an outlet on one side, a baffle across the chamber adjacent the flue outlet, the floor of said chamber having a series of holes therethrough, a combustion chamber under the tank in communication with said flue chamber through said holes, arms revolubly mounted within the tank extending upwardly in close proximity to the side wall of the tank, a central baffle in the tank terminating by its vertical edges to permit said arms to pass between those edges and said tank wall, and means for revolving said arms, a conical floor in the tank, a drain pipe depending from the floor apex, and an agitating member revoluble with said arms extending down into said pipe.

4. In a still, a cylindrical tank having a conical floor; a flue chamber encircling the lower part of the tank and having a flue outlet; a baffle in the chamber; the floor of said chamber having a series of holes therethrough; a combustion chamber about the lower end of said tank in communication with said flue chambers through said holes; a vertical shaft revolubly supported in the tank; and a pair of arms extending laterally from the shaft to have portions turned vertically to extend along the wall of the tank in relatively close proximity thereto, said arms extending at least over a part of the conical floor and that part of the tank surrounded by said flue chamber.

5. In a still, a cylindrical tank having a conical floor; a flue chamber encircling the lower part of the tank and having a flue outlet; a baffle in the chamber; the floor of said chamber having a series of holes therethrough; a combustion chamber about the lower end of said tank in communication with said flue chambers through said holes; a vertical shaft revolubly supported in the tank; and a pair of arms extending laterally from the shaft to have portions turned vertically to extend along the wall of the tank in relatively close proximity thereto, said arms extending at least over a part of the conical floor and that part of the tank surrounded by said flue chamber; and a central vertical baffle terminating by its outer edges to permit said arms to pass therearound.

6. In a still, a cylindrical tank having a conical floor; a flue chamber encircling the lower part of the tank and having a flue outlet; a baffle in the chamber; the floor of said chamber having a series of holes therethrough; a combustion chamber about the lower end of said tank in communication with said flue chambers through said holes; a vertical shaft revolubly supported in the tank; and a pair of arms extending laterally from the shaft to have portions turned vertically to extend along the wall of the tank in relatively close proximity thereto, said arms extending at least over a part of the conical floor and that part of the tank surrounded by said flue chamber; and a central vertical baffle terminating by its outer edges to permit said arms to pass therearound; a drain pipe depending from the apex of said conical floor; and an agitating member extending from said shaft into said pipe.

7. In a system for renovating used oil employing a still and means for conducting steam into and out of the still, the combination of a separator into which said means discharges along with vapors from the still, said separator having a sloping floor; means comprising a pump taking suction from under the high end of the floor for evacuating the separator to cause escape of the steam therefrom, the induced flow of said steam through the separator causing said vapors to be subjected to the temperature of the steam to cause condensation of the vapors thereby; and roughened surfaced means in the separator setting up a resistance to flow therethrough and inducing condensation by reason of said roughened surfaces.

8. In a system for renovating used oil employing a still and means for conducting steam into and out of the still, the combination of a separator into which said means discharges along with vapors from the still, said separator having a sloping floor; means comprising a pump taking suction from under the high end of the floor for evacuating the separator to cause escape of the steam therefrom, the induced flow of said steam through the separator causing said vapors to be subjected to the temperature of the steam to cause condensation of the vapors thereby; a suction valve communicating with the separator; means for setting the valve to open at a predetermined suction; and roughened surfaced means in the separator setting up a resistance to flow therethrough and inducing condensation by reason of said roughened surfaces.

9. A still for renovating used oil comprising a tank, a flue chamber encircling the lower outer side of the tank having an outlet on one side, a baffle across the chamber adjacent the flue outlet, the floor of said chamber having a series of holes therethrough, a combustion chamber under the tank in communication with said flue chamber through said holes, arms revolubly mounted within the tank extending upwardly in close proximity to the side wall of the tank, a central baffle in the tank terminating by its vertical edges to permit said arms to pass between those edges and said tank wall, means for revolving said arms, a conical floor in the tank, a pipe conducting steam entering the tank and having depending branches which discharge against the conical floor, and a drain pipe depending from the floor apex.

JAMES F. BELLINGER.